United States Patent
Roberts

(10) Patent No.: US 8,104,263 B2
(45) Date of Patent: Jan. 31, 2012

(54) ACTUATOR ARRANGEMENT FOR VECTORABLE NOZZLES OF GAS TURBINE

(75) Inventor: Michael C. Roberts, Bristol (GB)

(73) Assignee: Rolls-Royce plc, London (GB)

( * ) Notice: Subject to any disclaimer, the term of this patent is extended or adjusted under 35 U.S.C. 154(b) by 494 days.

(21) Appl. No.: 12/453,827

(22) Filed: May 22, 2009

(65) Prior Publication Data
US 2010/0025493 A1 Feb. 4, 2010

(30) Foreign Application Priority Data
Aug. 4, 2008 (GB) .................................. 0814113.7

(51) Int. Cl.
*F02K 1/00* (2006.01)

(52) U.S. Cl. ............. 60/232; 92/88; 244/12.5; 244/23 D

(58) Field of Classification Search ..................... 60/232, 60/796; 239/265.35; 92/88; 244/12.5, 23 D
See application file for complete search history.

(56) References Cited

U.S. PATENT DOCUMENTS

| | | | | |
|---|---|---|---|---|
| 3,178,887 | A * | 4/1965 | Wilde et al. | 239/265.33 |
| 6,199,772 | B1 * | 3/2001 | Renggli | 239/265.33 |
| 6,694,723 | B2 * | 2/2004 | Ward | 60/232 |
| 7,758,052 | B2 * | 7/2010 | Roberts | 277/436 |
| 7,770,379 | B2 * | 8/2010 | Roberts | 60/232 |
| 2008/0067753 | A1 * | 3/2008 | Roberts | 277/434 |

FOREIGN PATENT DOCUMENTS

| | | |
|---|---|---|
| DE | 100 06 769 A1 | 9/2001 |
| GB | 1053150 | 12/1966 |
| GB | 2 431 142 A | 4/2007 |
| GB | 2 442 007 A | 3/2008 |
| JP | A-2001-280308 | 10/2001 |

* cited by examiner

*Primary Examiner* — William H Rodriguez
*Assistant Examiner* — Vikansha Dwivedi
(74) *Attorney, Agent, or Firm* — Oliff & Berridge, PLC

(57) ABSTRACT

An actuator arrangement for moving a first component relative to a second component, the arrangement comprising: an actuator chamber for receiving a fluid under pressure, a side wall of the chamber being fixed relative to the first component; an actuating element fixed relative to the second component and located inside the chamber for sliding movement along the chamber, relative to the side-wall; and a sealing element which provides a corresponding sliding seal between the actuating element and the sidewall for maintaining an actuating fluid pressure differential across the actuating element thereby to drive the actuating element relative to said side-wall, under said fluid pressure differential, for driving said relative movement of the first and second components; wherein the arrangement further comprises an external sidewall brace connected to the second component for corresponding movement with the actuating element along the outside of the sidewall, the brace being slidably or rollably braced against the outside of the side-wall close to the sealing element thereby to provide respective local reinforcement of the side-wall at or near the sliding seal, in accordance with the position of the actuating element.

13 Claims, 3 Drawing Sheets

ACTUATOR ARRANGEMENT FOR VECTORABLE NOZZLES OF GAS TURBINE

The present invention relates to an actuator arrangement which utilises fluid pressure to move a first component relative to a second component, in particular to effect relative rotation of nozzle sections in a vectorable nozzle for a gas turbine.

Fluid actuator arrangements, which are energised by fluid pressure, are well known. Such arrangements are particularly suited to applications where it is desired to minimise weight.

One such application is in vectorable nozzles for gas turbines, comprising scarfed nozzle sections which are rotated relative to one another in order to adjust the flow path through the nozzle and hence vector the engine thrust generated by the gas turbine. Here, fluid actuator arrangements utilising pressure from the respective gas turbine compressor to rotate the nozzle sections offer significant weight savings compared to corresponding mechanical arrangements, which typically utilise relatively complicated and heavy mechanical gearing arrangements.

A fluid actuator arrangement for a vectorable gas turbine nozzle is described in published UK Patent Application No GB 2431142, which effectively provides for direct fluid actuation of one or more of the nozzle sections via a piston member, fixed directly to the respective nozzle section, which transmits the fluid pressure force from the gas turbine compressor to the associated nozzle section.

Although, by dispensing with relatively heavy mechanical transmissions, fluid pressure actuator arrangements such as the one described in GB 2431142 offer significant weight savings, the need to maintain an effective pressure differential across the piston member has tended to impose structural limitations on these actuator arrangements. In particular, the walls of any associated piston chamber need to be sufficiently stiff to resist deformation due to mechanical stress caused by the actuating fluid pressure. In practice therefore, there have been limits to the weight savings that can be achieved using these conventional arrangements.

It is an object of the present invention to seek to provide an improved actuator arrangement.

According to the present invention there is provided an actuator arrangement for moving a first component relative to a second component, the arrangement comprising:

an actuator chamber for receiving a fluid under pressure, a side wall of the chamber being fixed relative to the first component;

an actuating element fixed relative to the second component and located inside the chamber for sliding movement along the chamber, relative to the side-wall; and a sealing element which provides a corresponding sliding seal between the actuating element and the sidewall for maintaining an actuating fluid pressure differential across the actuating element thereby to drive the actuating element relative to said side-wall, under said fluid pressure differential;

wherein the arrangement further comprises an external side-wall brace connected to the second component for corresponding movement with the actuating element along the outside of the sidewall, the brace being slidably or rollably braced against the outside of the side-wall, close to the sealing element, thereby to provide respective local reinforcement of the side-wall at or near the sliding seal, in accordance with the position of the actuating element.

The chamber and the actuating element may have a corresponding non-circular cross-section.

The chamber may comprise a plurality of said side-walls fixed relative to the first component, the sealing element forming a sliding seal with each side-wall and the brace being slidably or rollably braced against one or more of said side-walls thereby to locally reinforce each of the respective side-walls at or near the respective sliding seal.

The first component may comprise a channel section having a substantially U-shaped cross-section forming three side-walls of the actuator chamber.

The channel section may be an annular channel section defining an outwardly facing corresponding annular channel, and the second component may comprise a circumferential wall section rotatably engaging the outer circumferential edges of the opposing side walls of the channel section to form an annular actuator chamber for the actuating element.

In one embodiment, the circumferential wall section forms respective opposing flange sections on either side of the channel and the brace is fixedly mounted to said flange sections.

The brace may comprise opposing reinforcing elements rollably or slidably braced respectively against the opposing sidewalls of the channel section.

Each reinforcing element may comprise a rigid axle fixedly mounted to the second component and extending alongside a respective side-wall, each rigid axle rotatably supporting a roller element which rollably engages the outside of the respective side-wall for rolling movement with the actuating element along the outside of the side wall.

The respective side-wall may comprise a load-bearing race which bears the roller element.

In an embodiment of the invention, the first and second component engage one another for relative rotating movement about a rotation axis and the actuator chamber is an annular chamber centred on the rotation axis such that said driving movement of the actuating element drives relative rotation of the first and second component.

According to a further aspect of the present invention there is provided a nozzle in a gas turbine, the nozzle comprising the actuator arrangement of the present invention, wherein the first component is or is connected to a first nozzle section and the second component is or is connected to a second nozzle section, the actuator chamber being provided with one or more fluid ports for delivering and/or venting fluid to/from the actuator chamber thereby to drive the actuating element along the chamber for actuating relative rotation of the nozzle sections.

According to a yet further aspect of the present invention, there is provided a gas turbine comprising such a nozzle.

The nozzle may be a vectorable nozzle.

Embodiments of the invention will now be described in more detail, by way of example, with reference to the accompanying Figures, in which.

Figure 1:
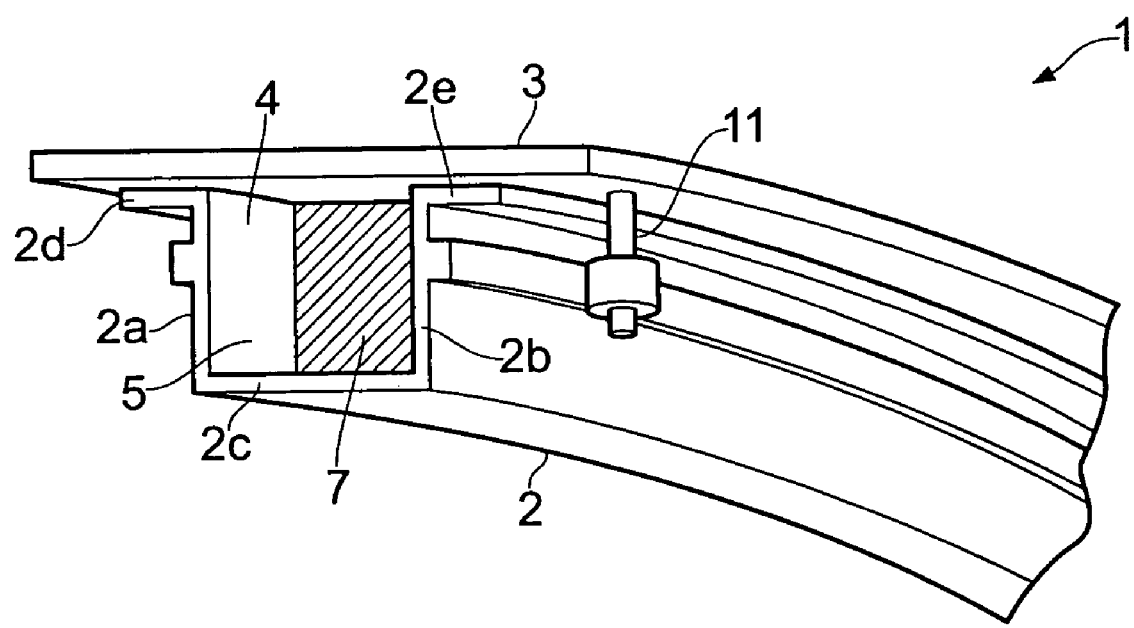
FIG. 1 is a cross-sectional perspective view showing part of an actuator arrangement according to the present invention.

With reference to FIG. 1 there is shown part of an actuator arrangement 1 for moving a first component 2 relative to a second component 3.

The first component 2 is in the form of an annular channel section (only a segment of the channel section is illustrated in FIG. 1) comprising opposing annular side walls 2a, 2b and a third, cylindrical side wall 2c extending perpendicularly between the respective inner edges of the side walls 2a, 2b. The sidewalls 2a, 2b and 2c thus together form an outwardly directed annular channel 4 having a U-shaped cross-section.

The outer edges of the side walls 2*a*, 2*b* support respective perpendicular cylindrical flange portions 2*d*, 2*e*, which extend co-axially on the outside of the channel 4.

The second component 3 is in the form of a circular, circumferential wall section having an inner diameter corresponding to the outer diameter of the first component 2. The circumferential wall section rotatably engages the flange portions 2*d*, 2*e* so that it is co-axial with the side-wall 2*c*, whereby the first and second components 2, 3 together form an annular actuator chamber 5 having a non-circular (generally rectangular) cross-section (see FIG. 2 in particular).

A respective pair of circumferential grooves 6*a*, 6*b* is cut into each of the flange sections 2*d*, 2*e*. The grooves 6*a*, 6*b* seat corresponding O-rings 6*c*, 6*d*, which provide a circumferential sliding seal between the first component 2 and the second component 3.

An actuating element in the form of a piston 7 is fixed to the inner face of the second component 3 and is slidably received in the channel 4 for sliding movement along the chamber 5 (in a circular path).

The piston 7 has a non-circular cross-section corresponding generally to the cross-section of the annular chamber 5. Thus, the piston 7 effectively partitions the annular actuator chamber 5.

A sealing element is provided around the piston 7 for forming a piston seal between the piston and each of the side walls 2*a*, 2*b* and 2*c*. In this case, two separate sealing elements 8, 9 are provided in the manner described in detail in published UK Patent Application No GB 2442007A. However, any other suitable sealing element may be used as appropriate.

The sealing elements 8, 9 limit leakage of fluid inside the chamber 5, past the piston 7, so as to maintain any fluid pressure differential introduced across the piston 7 for driving the piston 7 along the actuator chamber 5 to effect rotation of the components 2, 3.

Any suitable method may be used for introducing a fluid pressure differential across the piston 7. For example, a second partitioning member may be provided in the actuator chamber 5, fixed to the first component 2, thereby effectively to divide the annular chamber into a corresponding pair of circumferential chambers on either side of the piston 7. Pressurised fluid may then be selectively delivered or vented from each circumferential chamber through corresponding fluid ports in order to create a suitable pressure differential across the piston 7.

Figure 2:
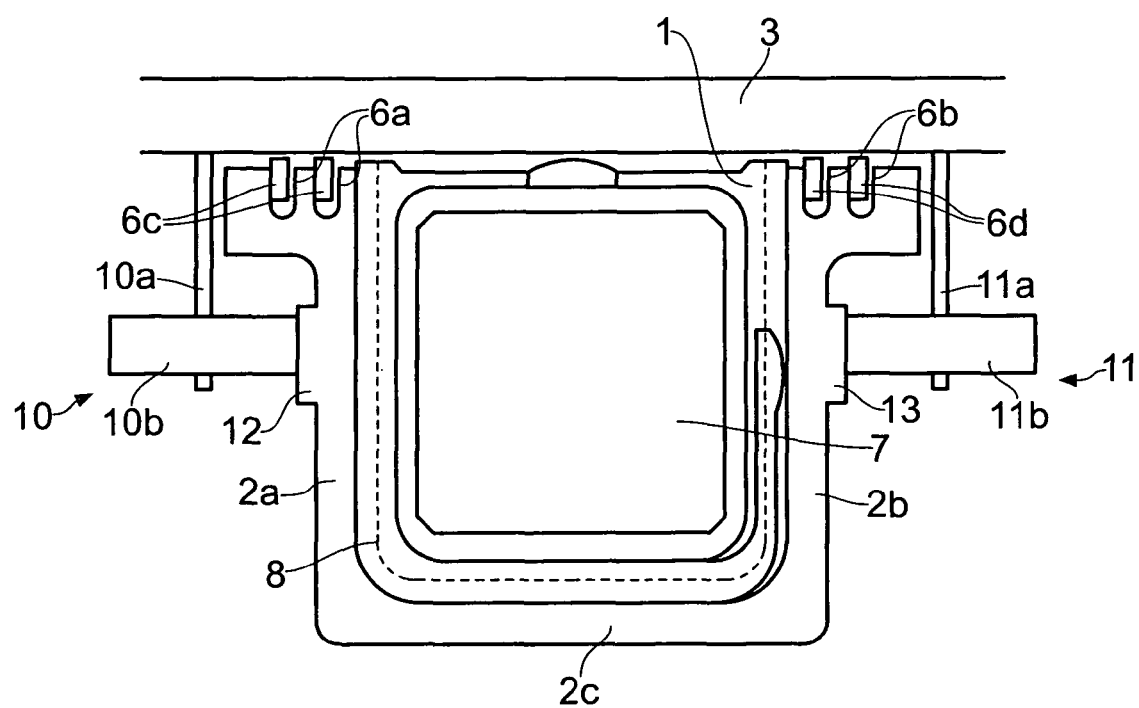
FIG. 2 is a two dimensional cross-sectional view corresponding to the cross-section shown in FIG. 1.

Still referring to FIGS. 1 and 2, the actuator arrangement 1 is further provided with an external side wall brace for bracing the opposing side walls 2*a*, 2*b*. The brace comprises a pair of reinforcing elements 10, 11 (only reinforcing element 11 is visible in FIG. 1) which are rollably braced against the respective side walls 2*a*, 2*b*.

Each reinforcing element comprises a respective rigid axle 10*a*, 11*a*, extending inwardly from the inner face of the respective flange portion 2*d*, 2*e*, and a corresponding roller element 10*b*, 11*b* rotatably supported near the inner end of the respective axle 10*a*, 11*a*.

The roller elements 10*b*, 11*b* rollably engage corresponding races 12, 13 formed on the outside of the respective side walls 2*a*, 2*b*, at or near the sealing elements 8, 9. Thus, the reinforcing elements 10, 11 laterally brace and reinforce the side walls 2*a*, 2*b* at or near the piston sealing elements 8, 9. At the same time, the roller elements 10*b*, 11*b* provide for rolling movement of the reinforcing elements 10, 11 along the outside of the side walls 2*a*, 2*b* with the piston 7 (via the interconnecting second component 3) as the piston 7 moves along the chamber 5 under an actuating pressure differential across the piston 7. The reinforcing elements 10, 11 thus provide local reinforcement or "stiffening" of each of the side walls 2*a*, 2*b*, at or near the piston-seal between the piston 7 and the side walls 2*a*, 2*b*, in accordance with the working position of the piston 7 along the chamber 5.

In order to reduce "skid" between the brace and the side-walls 2*a*, 2*b*, slidable elements may be used in place of the roller elements 10*a*, 10*b*.

It is envisaged that local reinforcement of the side walls 2*a*, 2*b* at or near the seal between the piston 7 and the side walls 2*a*, 2*b* will allow for a reduction in the thickness of the side-walls 2*a*, 2*b* whilst nevertheless ensuring that the sealing elements 8, 9 maintain an effective local seal between the piston 7 and the side walls 2*a*, 2*b*. In this manner, it is envisaged that a reduction in the weight of the side walls 2*a*, 2*b* can be achieved, without compromising local seal efficiency around the piston 7.

The present invention finds particular application in vectorable nozzles for gas turbines.

Figure 3:
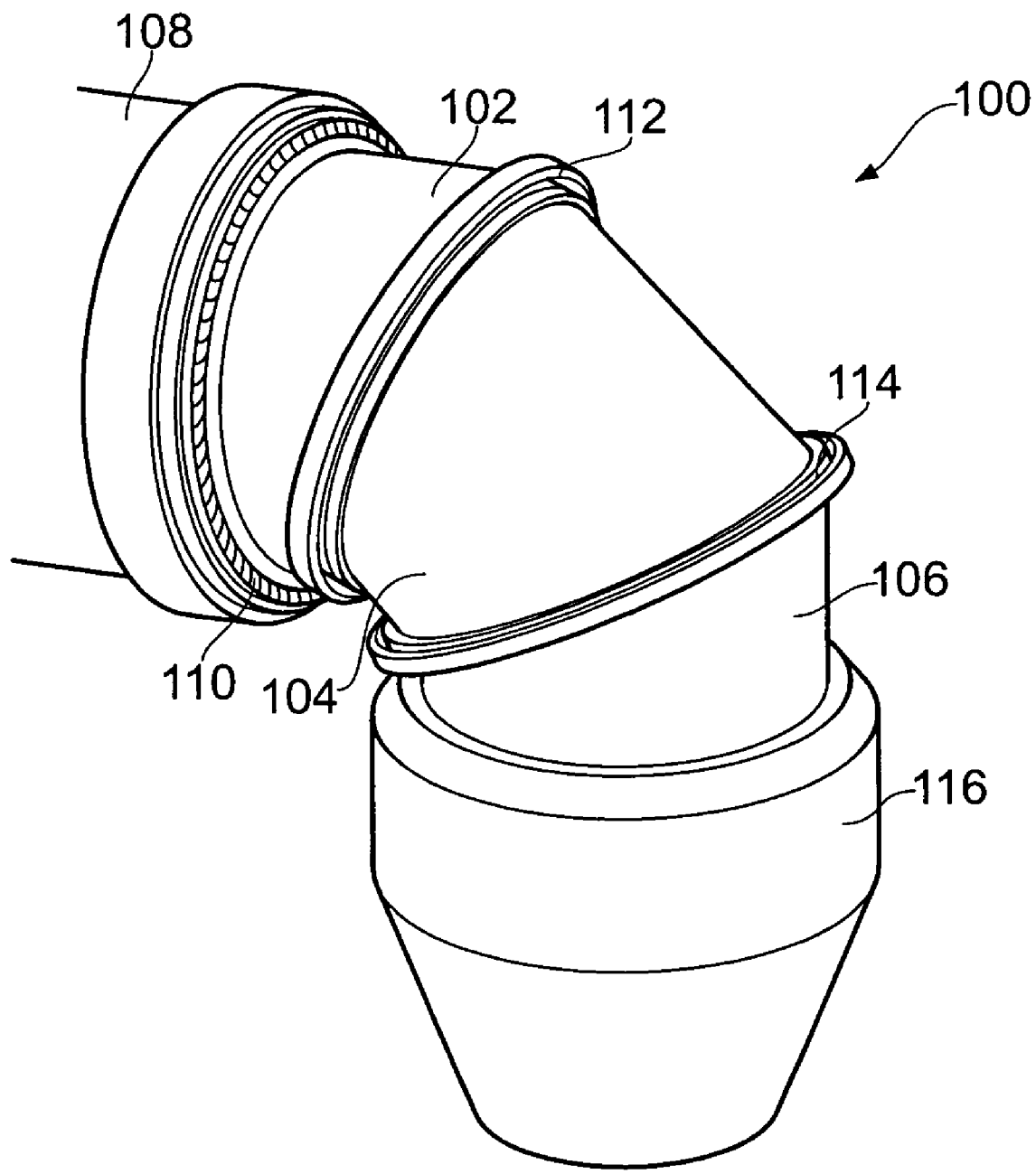
FIG. 3 is a perspective view of a vectorable nozzle for a gas turbine.

FIG. 3 shows a vectorable nozzle for a gas turbine, in this case a three bearing swivel nozzle 100 comprising three adjacent duct sections 102, 104 and 106.

Briefly, the first, or upstream, duct section 102 is rotatably mounted to a final engine duct sections 108 by means of a corresponding bearing ring assembly 110 between the duct 108 and the nozzle section 102. The second, or mid, nozzle section 104 is rotatably mounted at its upstream end to the downstream end of the first nozzle section 102 by means of a bearing ring assembly 112 and its downstream end to the third, or downstream, nozzle section 106 by means of a third bearing ring assembly 114.

The nozzle section 106 is fixed to a final nozzle outlet section 116 having a variable exit area.

The inlet and exit planes of each of the three nozzle sections 102, 104 and 106 are angled with respect to each other, in the manner of a scarf joint, such that relative rotation of the nozzle sections 102, 104 and 106 adjust the nozzle 100 between an axial configuration, extending along the notional duct axis, and a "90° configuration" shown in FIG. 3, where the nozzle sections 102, 104 and 106 form a 90° bend for redirecting the jet efflux, and hence the engine thrust, downwards. In this manner, the nozzle 100 can be used to vector the engine thrust from an associated gas turbine.

It is envisaged that the actuator arrangement according to the present invention may conveniently be used to actuate relative rotation of the respective nozzle sections 102, 104 and 106 in order to vector the associated engine thrust.

Thus, referring also back to FIGS. 1 and 2, the first component 2 may be fixedly attached to the inner race of the respective bearing ring 110, 112 or 114 and the outer component 3 may be fixedly attached to the outer race of the respective bearing ring 110, 112 or 114. Using a suitable hydraulic or pneumatic circuit (not shown) fluid may be delivered and/or vented to/from separate regions of the respective annular chamber 5 thereby to introduce a pressure differential across the respective piston 7 for actuating movement of the respective bearing inner race relative to the bearing outer race.

In the case where a pneumatic circuit is used, this may conveniently utilise pressure generated from the respective gas turbine compressor.

Although in the embodiment described the brace is shown as bracing opposing side walls of an annular actuator channel, in general any number of side walls may be braced, for example in the case where a number of side walls form a seal with a given actuating element. Similarly, only a single side wall may be braced in certain arrangements.

In the case where there are a number of actuating elements forming a seal with a given side-wall, or where a single actuating element forms a plurality of separate seals with a given side wall, the side wall may be locally reinforced at or near each sliding seal using a suitable brace. For example, in the case where the brace comprises reinforcing elements, separate reinforcing elements may be provided at or near each separate sliding seal in order to simultaneously (and locally) reinforce each separate seal.

Although the invention has been described specifically with reference to relative rotation of a first and second component in the context of vectorable gas turbine nozzles, the invention is not intended to be limited specifically to actuation of relative rotation between components.

The invention claimed is:

1. An actuator arrangement for moving a first component relative to a second component, the arrangement comprising:
   an actuator chamber for receiving a fluid under pressure, a side wall of the chamber being fixed relative to the first component;
   an actuating element fixed relative to the second component and located inside the chamber for sliding movement along the chamber, relative to the side-wall; and
   a sealing element which provides a corresponding sliding seal between the actuating element and the sidewall for maintaining an actuating fluid pressure differential across the actuating element thereby to drive the actuating element relative to said side-wall, under said fluid pressure differential, for driving said relative movement of the first and second components;
   wherein the arrangement further comprises an external side-wall brace connected to the second component for corresponding movement with the actuating element along the outside of the sidewall, the brace being slidably or rollably braced against the outside of the side-wall close to the sealing element thereby to provide respective local reinforcement of the side-wall at or near the sliding seal, in accordance with the position of the actuating element.

2. An actuator arrangement according to claim 1, wherein the chamber and the actuating element have a corresponding non-circular cross-section.

3. An actuator arrangement according to claim 1, comprising a plurality of said side-walls fixed relative to the first component, the sealing element forming a sliding seal with each side-wall and the brace being slidably or rollably braced against one or more of said side-walls thereby to locally reinforce each of the respective side-walls at or near the respective sliding seal.

4. An actuator arrangement according to claim 3, wherein the first component comprises a channel section having a substantially U-shaped cross-section forming three side-walls of the actuator chamber.

5. An actuator arrangement according to claim 4, wherein the channel section is an annular channel section defining an outwardly facing corresponding annular channel, and the second component comprises a circumferential wall section rotatably engaging the outer circumferential edges of the opposing side walls of the channel section to form an annular actuator chamber for the actuating element.

6. An actuator arrangement according to claim 5, wherein the circumferential wall section forms respective opposing flange sections on either side of the channel and the brace is fixedly mounted to said flange sections.

7. An actuator arrangement according to claim 5, wherein the brace comprises opposing reinforcing elements rollably or slidably braced respectively against the opposing sidewalls of the channel section.

8. An actuator arrangement according to claim 7, wherein each reinforcing element comprises a rigid axle fixedly mounted to the second component and extending alongside a respective side-wall, each rigid axle rotatably supporting a roller element which rollably engages the outside of the respective side-wall for rolling movement with the actuating element along the outside of the side wall.

9. An actuator arrangement according to claim 6, wherein the respective side-wall comprises a load-bearing race which bears the roller element.

10. An actuator arrangement according to claim 1, wherein the first and second component engage one another for relative rotating movement about a rotation axis and the actuator chamber is an annular chamber centred on the rotation axis such that said driving movement of the actuating element drives relative rotation of the first and second component.

11. A nozzle in a gas turbine, the nozzle comprising an actuator arrangement according to claim 5 wherein the first component is or is connected to a first nozzle section and the second component is or is connected to a second nozzle section, the actuator chamber being provided with one or more fluid ports for delivering and/or venting fluid to/from the actuator chamber thereby to drive the actuating element along the chamber for actuating relative rotation of the nozzle sections.

12. A nozzle according to claim 11, wherein the nozzle is a vectorable nozzle.

13. A gas turbine comprising a nozzle according to claim 11.

* * * * *